United States Patent [19]

Yoshimoto

[11] Patent Number: 4,688,207
[45] Date of Patent: Aug. 18, 1987

[54] CHANNEL QUALITY MONITORING APPARATUS

[75] Inventor: Makoto Yoshimoto, Tokyo, Japan

[73] Assignee: NEC Corporation, Japan

[21] Appl. No.: 789,486

[22] Filed: Oct. 21, 1985

[30] Foreign Application Priority Data

Oct. 24, 1984 [JP] Japan ............................. 59-223758

[51] Int. Cl.⁴ ............................................. H04J 3/14
[52] U.S. Cl. ......................................... 370/13; 371/3; 371/37
[58] Field of Search ................. 370/13, 17; 371/3, 37

[56] References Cited

U.S. PATENT DOCUMENTS

| | | | |
|---|---|---|---|
| 3,688,265 | 8/1972 | Carter et al. | 371/3 |
| 3,891,969 | 6/1975 | Christensen | 371/3 |
| 3,949,208 | 4/1976 | Carter | 371/3 |
| 4,604,747 | 8/1986 | Onishi et al. | 371/37 |

Primary Examiner—Douglas W. Olms
Attorney, Agent, or Firm—Laff, Whitesel, Conte & Saret

[57] ABSTRACT

A channel quality monitoring apparatus provided in terminal equipment of digital radio communication system comprises a syndrome generator circuit responsive to a digital multiplexed signal of a receiving signal, a signal converter circuit for converting an error-corrected digital multiplexed signal into a digital multiplexed signal with which a predetermined parity detection is possible, a parity detector circuit for effecting a parity detection of the digital multiplexed signal from the signal converter circuit, and computing circuitry configured as an error rate detector circuit responsive to outputs from the syndrome generator means and the parity detector circuit. When occurrence of code error detected on the basis of the syndrome continues for the duration more than a predetermined time period, the computing circuitry is operative to compute an error rate of the receiving digital multiplexed signal on the basis of the syndrome. In contrast, when occurrence of code error detected continues for the duration equal to or less than the predetermined time period, the computing circuitry is operative to compute an error rate of the receiving digital multiplexed signal on the basis of the output from the parity detector circuit. Thus, this apparatus provides an improved detection accuracy of a channel error rate in the equipment of receiving and demodulating system.

6 Claims, 3 Drawing Figures

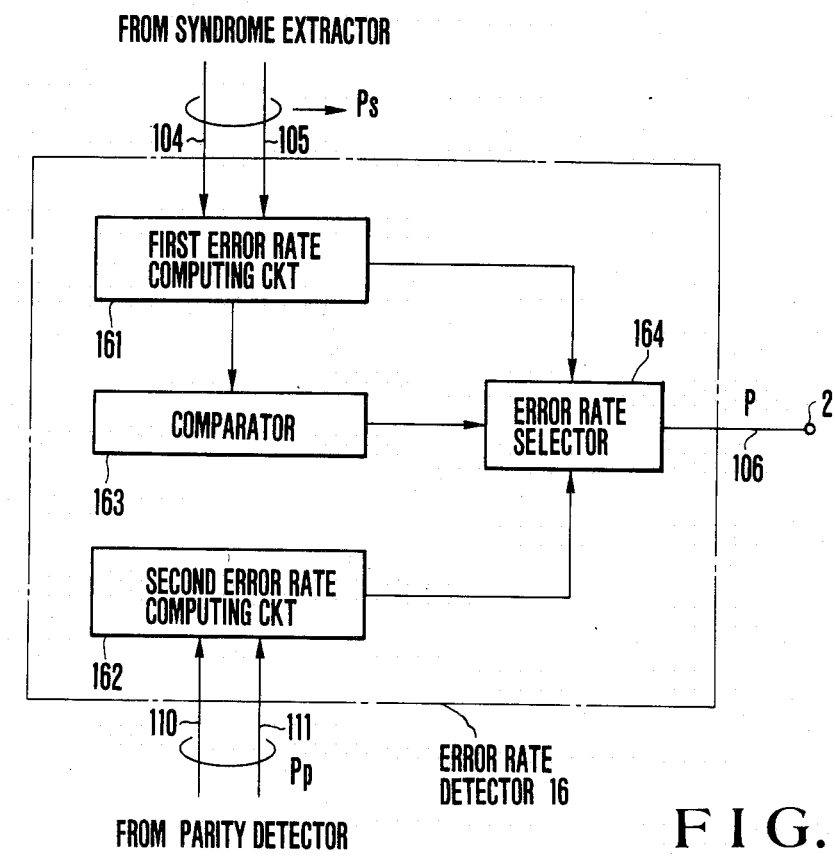
FIG.2
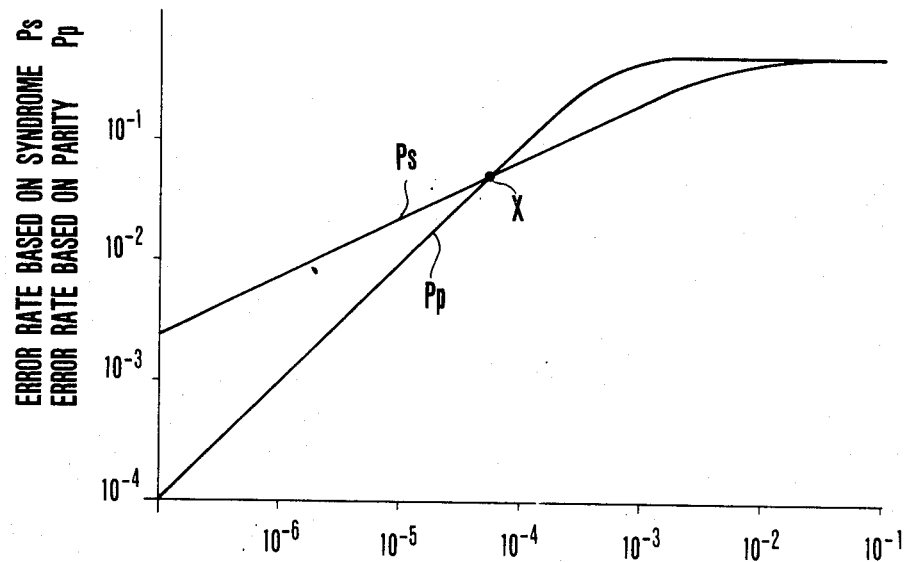
FIG.3 CORRECTED ERROR RATE (CHANNEL ERROR RATE) P

CHANNEL QUALITY MONITORING APPARATUS

BACKGROUND OF THE INVENTION

The present invention relates to a quality monitoring apparatus for a communication channel. Specifically, the present invention is concerned with a channel quality monitoring apparatus capable of providing an improved detection accuracy of a channel error rate in a digital radio transmission system.

In a conventional channel quality monitoring apparatus used in a digital radio transmission system, there has been employed a method of monitoring a frame synchronizing signal or a parity signal etc. generated at a stage of frame synchronization on the basis of a signal received and demodulated in a receiver and demodulator, or a method of generating a preliminary pulse signal including a clock signal or a clock signal added with a predetermined fixed pattern extracted from a signal received and demodulated in a discriminating unit of a demodulator provided in a receiver and demodulator to predict or forecast a channel quality based on the preliminary pulse signal.

However, drawbacks with such conventional channel quality monitoring apparatus are as follows: First is a limited accuracy in channel quality judgement. Second, a large redundant bit length is required for ensuring a high detection accuracy of channel error rate, resulting in a degraded channel utilization efficiency.

SUMMARY OF THE INVENTION

With the above in view, an object of the present invention is to provide a channel quality monitoring apparatus capable of providing an improved detection accuracy of a channel error rate in an apparatus of receiving and demodulating system.

A channel quality monitoring system according to the present system is characterized in that a syndrome used for correcting an error code is utilized for monitoring an error rate of a communication channel.

To realize the above feature, the channel quality monitoring system according to the present invention is configured to combine a syndrome generator operative to generate a predetermined syndrome with a conventional channel monitoring apparatus in order to select an optimum error rate depending upon error occurrence time detected on the basis of the syndrome generated on the receiving side receiving a sent message, and to provide means for detecting an error rate on a communication channel in a predetermined apparatus of receiving and demodulating system provided in terminal equipment of digital radio transmission system, or in a predetermined apparatus of receiving and demodulating system provided in both terminal equipment of digital radio transmission system and a predetermined repeater apparatus.

Specifically, the channel quality monitoring apparatus provided in terminal equipment of digital radio communication system to monitor an error rate of a receiving signal comprises syndrome generator means responsive to a digital multiplexed signal of the receiving signal to generate a syndrome for correcting code error, converter means for converting the digital multiplexed signal which has undergone error correction based on the syndrome outputted from the syndrome generator means into a second digital multiplexed signal with which a predetermined parity detection is possible, parity detector means for effecting a parity detection of the second digital multiplexed signal outputted from the converter means, and computing means responsive to outputs from the syndrome generator means and the parity detector means, wherein when occurrence of code error detected on the basis of the syndrome generated in the syndrome generator means continues for the duration less than a predetermined time period, the computing means is operative to compute an error rate of the receiving digital multiplexed signal on the basis of the syndrome, while when occurrence of code error detected on the basis of the syndrome continues for the duration equal to or more than the predetermined time period, the computing means is operative to compute an error rate of the receiving digital multiplexed signal on the basis of the output from the parity detector means.

BRIEF DESCRIPTION OF THE DRAWINGS

The feature and advantages of a channel quality monitoring apparatus according to the present invention will become more apparent from the following description taken in conjunction with the accompanying drawings, in which:

FIG. 2 is a block diagram illustrating details of an error rate detector circuit provided in the channel quality monitoring apparatus shown in FIG. 1; and FIG. 3 is a graph showing a corrected error rate (channel error rate) P versus a syndrome error rate $P_s$ and a parity error rate $P_p$ employed in the present invention.

DESCRIPTION OF THE PREFERRED EMBODIMENT PRINCIPLE OF THE INVENTION

Figure 1:
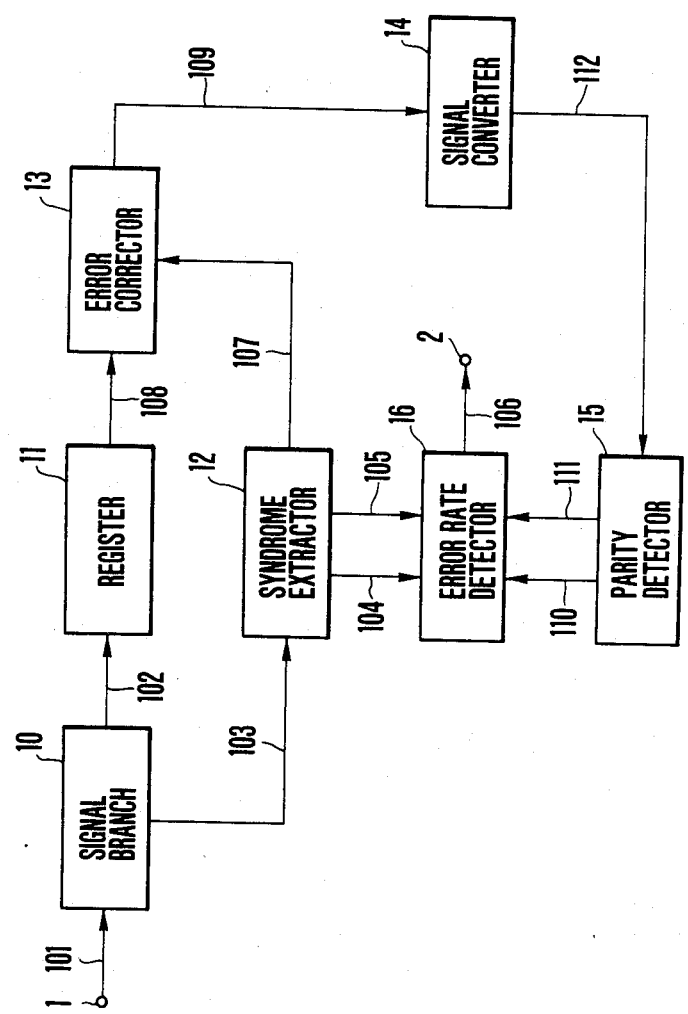
FIG. 1 is a block diagram illustrating an embodiment of a channel quality monitoring apparatus according to the present invention.

In accordance with an error correcting scheme using syndrome, in case where an code error of a receiving digital multiplexed signal is fixed, the syndrome of this signal is expressed as "0" indicating that there is no error. The channel quality monitoring system according to the present invention is provided with computing means for eliminating such an undesired phenomenon wherein when occurrence of code error detected on the basis of the syndrome continues for the duration equal to or more than a predetermined time, computing means functioning as an error rate detector executes a processing for computing an error rate of a receiving signal on the basis of a code error detected by parity detector means.

The definition of the syndrome used in the present invention will be described. It is now assumed that a transmission code vector expressed as a column vector having n components in total comprising K code bits and r parity check bits is represented by a vector $\overline{T}$, and that the parity check condition which satisfies the vector $\overline{T}$ is symbolically expressed by the relationship $H\overline{T}=0$, where H denotes a parity check matrix with n columns and r rows having the binary symbols of 0 and 1 as their components. It is further assumed that a code received at a receiving terminal of a transmission path is represented by $\overline{R}$ vector expressed as a column vector having n components, and that the $\overline{R}$ vector is replaced by the expression $\overline{T}+\overline{E}$, where E is a transmission error vector.

Further, let us suppose a vector S expressed as follows:

$$\vec{S} = \vec{H}\,\vec{R}$$
$$= \vec{H}\,(\vec{T} + \vec{E})$$
$$= \vec{H}\,\vec{E}.$$

Thus, it is understood that transmission error can be detected depending upon whether the vector $\vec{S}$ represents 0 or not. This vector $\vec{S}$ is called a "syndrome".

PREFERRED EMBODIMENT

A preferred embodiment of a channel quality monitoring apparatus according to the present invention will be described with reference to attached drawings.

As shown in FIG. 1, the channel quality monitoring apparatus in this embodiment comprises an input terminal 1 for a receiving signal 101, a signal branch circuit 10 for branching the signal 101 into signals 102 and 103, a register 11 for holding the signal 102 from the branch circuit 10, a syndrome extracting circuit 12 for extracting a syndrome from the signal 103, an error correcting circuit 13 responsive to an output 108 from the register 11 and an output 107 from the syndrome extracting circuit 12 to effect an error correction, a signal converter circuit 14 for converting a signal 109 subject to an error correction into a signal 112 with which parity detection is possible, a parity detector circuit 15 responsive to the signal 112 from the signal converter circuit 14, and an error rate detector circuit 16 responsive to outputs 104 and 105 from the syndrome extracting circuit 12 and to outputs 110 and 111 from the parity detector circuit 15. In addition, the error rate detector circuit 16 is provided with an error rate output terminal 2.

Referring to FIG. 2, there are shown details of the error rate detector circuit 16 comprising first error rate computing circuit 161 responsive to the outputs 104 and 105 from the syndrome extractor 12 to produce a first error rate signal based on the syndrome, a second error rate computing circuit 162 responsive to the outputs 110 and 111 from the parity detector 15 to produce a second error rate based on the parity, a comparator 163 for comparing the first error rate based on the syndrome from the first error rate computing circuit 161 with a predetermined error rate to produce an output signal indicative of the compared result, and an error rate selector circuit 164 operative to select either the first error rate based on the syndrome from the first error rate computing circuit 161 or the second error rate based on the parity from the second error rate computing circuit 162 depending upon the output signal indicative of the compared result from the comparator 163.

The operation of the channel quality monitoring aparatus thus configured will be described.

The signal 101 including a digital multiplexed signal and a clock signal is inputted to the input terminal 1. The signal 101 thus inputted is branched into signals 102 and 103 in the signal branch circuit 10. The signal 103 is sent to the syndrome extracting circuit 12 to extract a predetermined syndrome. In the syndrome extracting circuit 12, a processing is executed to detect whether an error of the digital multiplexed sigal included in the signal 103 is present or not. Where there occurs an error, a processing is executed to identify an error position. When a check matrix is expressed by $\vec{H}$, a syndrome is symbolically expressed by $\vec{C}\cdot\vec{H}$ where C denotes a linear code. The syndrome extracting circuit 12 effects an error judgement operation as follows: When $\vec{C}\cdot\vec{H} \neq 0$, it is judged that there is an error, while when $\vec{C}\cdot\vec{H} = 0$, it is judged that there is no error. As previously described, however, there is a possibility that the syndrome extracting circuit 12 judges the case where error occurrence is fixed as a no-error although an error is actually occurring.

An example of an error detection using the syndrome will be now referred to. First, on the side of transmitting a message, a technique is employed to divide a transmission data train into a plurality of sub-blocks having a predetermined bit length (e.g. 81 bits) to add a predetermined redundant bit train of 3 bits to each sub-block. Then, a processing based on an error correcting code rule is applied to the three columns of sub-blocks of 81 bits to assign information indicative of error correcting code to the three columns of the redundant bit train of 3 bits, i.e. 9 bits, thus transmitting each data train divided into sub-blocks of 84 bits including the redundant bit train to which the information indicative of error correcting code is assigned.

On the side of receiving the sent message, a processing based on the same coding rule is applied to the three columns of the divided code trains to provide a syndrome of 9 bits. Thus, an error of the code train (the signal 108 in FIG. 1) can be corrected depending upon the value of the syndrome (the output 107 in FIG. 1) in the error correcting circuit 13. When the value of the syndrome represents zero, it is judged that there is no code error.

The basic operation of the syndrome extracting circuit 12 is described in detail in the related material (Second forum on information theory and its application, Nov., 1979).

Thus, the signal 109 including error-corrected digital multiplexed signal and clock signal is obtained as an output of the error correcting circuit 13. In the signal converter circuit 14, this signal 109 is then subjected to a speed conversion for removing bits which are added to the data signal at the transmitting side, and thus converted into the signal 112 including digital multiplexed signal and the clock signal, with which a predetermined parity can be detected. The signal 112 thus obtained is inputted to the parity detector circuit 15 to detect an error on the basis of parity check. The syndrome pulse 104 and the clock signal 105 among signals outputted from the syndrome extractor circuit 12 and the parity pulse 110 and the clock signal 111 among signals outputted from the parity detector circuit 15 are inputted to the error rate detector circuit 16 to detect an error rate corresponding to a predetermined time length to output the error rate signal 106 thus detected from the error rate output terminal 2.

The detailed operation of the error rate detector circuit 16 which is the subject of the present invention will be described.

Assuming that the number of parity check bits is 1000 and the number of data bits within a syndrome monitoring section is 81, an error rate P which has undergone error correction, an error rate $P_s$ based on the syndrome and an error rate $P_p$ based on the parity are derived as follows:

The relationship between an error rate P' before error correction is made and the above-mentioned corrected error rate P is expressed by the following equation.

$$P = K(P')^2$$

where K is a constant determined by the data bit n and the error correction system. In the case of a single Lee error correction, K is 125 for $n=81$ and $P=125(P')^2$ stands. In this case, $$P_s = 81\ P'$$
$$= 81 \times \sqrt{\frac{P}{125}},$$

and $$P_p = 1000\ P.$$

Referring to FIG. 3, there is shown the corrected error rate P versus the error rate $P_s$ based on the syndrome and the error rate $P_p$ based on the parity.

In general, where a comparison of the parity pulse with the syndrome pulse is continued for a predetermined time period, it is possible to compute an error rate of a communication channel using the number of parity pulses and the number of syndrome pulses. In such a case, it can be said that, within a predetermined time period, the larger the number of pulses to be outputted is, the higher the accuracy is when an error rate is computed.

In view of this, a cross point X (FIG. 3) of a curve indicative of the error rate $P_s$ based on the syndrome and a curve indicative of the error rate $P_p$ based on the parity is selected as a threshold for presenting channel quality criteria wherein the cross point X in this example is approximately $5\times 10^{-5}$. When the error rate of the channel is high, an error rate based on the parity is used, while when the error rate thereof is low, an error rate based on the syndrome is used.

The above-mentioned error rate detector circuit 16 is an example suitable for performing such a function.

With this circuit, when the first error rate from the first error rate computing circuit 161 is smaller than the predetermined error rate, the comparator 163 produce an output for allowing the selector circuit 164 to select the first error rate signal. In contrast, when the first error rate from the first error rate computing circuit 161 is equal to or greater than the predetermined error rate, the comparator 163 produce an output for allowing the selector circuit 164 to select the second error rate signal. Thus, the selector circuit 164 is operative to output first or second error rate signal selected in accordance with an occurrence time of an error of the receiving digital multiplexed signal, thus realizing an improved detection accuracy of channel error rate.

In accordance with the channel error detecting method using the syndrome and the parity employed in the channel quality monitoring system in the above-mentioned embodiment, an extremely high detection accuracy can be realized using a less number of redundant bits as compared to the conventional methods.

The present invention is applicable to digital radio transmission systems based on any modulation schemes.

As described above, the channel quality monitoring system according to the present invention is configured to effect an extraction of a predetermined syndrome and a parity detection, thereby detecting a channel error, thus advantageously providing a remakably improved detection accuracy of channel error rate.

What is claimed is:

1. A channel quality monitoring apparatus provided in terminal equipment of digital radio communication system to monitor an error rate of a receiving signal, comprising:
   syndrome generator means responsive to a digital multiplexed signal of said receiving signal to generate a syndrome for correcting code error;
   converter means for converting the digital multiplexed signal which has undergone error correction based on said syndrome outputted from said syndrome generator means into a second digital multiplexed signal with which a predetermined parity detection is possible;
   parity detector means for effecting a parity detection of said second digital multiplexed signal outputted from said converter means; and
   computing means responsive to outputs from said syndrome generator means and said parity detector means, wherein when occurrence of code error detected based on said syndrome generated in said syndrome generator means continues for the duration less than a predetermined time period, said computing means is operative to compute an error rate of said receiving digital multiplexed signal on the basis of said syndrome, while when occurrence of code error detected based on said syndrome continues for the duration equal to or more than said predetermined time period, said computing means is operative to compute an error rate of said receiving digital multiplexed signal on the basis of said output from said parity detector means.

2. A channel quality monitoring apparatus as set forth in claim 1, which further comprises a signal branch circuit for branching a signal including said digital multiplexed signal and a clock signal into first and second signals.

3. A channel quality monitoring apparatus as set forth in claim 2, which further comprises a register for holding said first signal.

4. A channel quality monitoring apparatus as set forth in claim 2, wherein said syndrome generator means is comprised of a circuit for extracting a syndrome with respect to said digital multiplexed signal included in said second signal to detect as to whether there is an error in said digital multiplexed signal or not.

5. A channel quality monitoring apparatus as set forth in claim 4, which further comprises an error correcting circuit responsive to an output from said register and said output from said syndrome extracting circuit to produce an error-corrected signal.

6. A channel quality monitoring apparatus as set forth in claim 4, wherein said computing means is configured as an error rate detector circuit comprising a first error rate computing circuit responsive to said output from said syndrome generator means to produce a first error rate signal, a second error rate computing circuit responsive to said output from said parity detector circuit to produce a second error rate signal, a comparator for comparing said first error rate signal from said first error rate computing circuit with a predetermined error rate to produce an output signal indicative of the compared result, and an error rate selector circuit adapted to input said first error rate signal from said first error rate computing circuit, said output signal indicative of the compared result from said comparator circuit, and said second error rate signal from said second error rate computing circuit wherein when said first error rate is smaller than said predetermined error rate, said signal selector circuit is operative to output said first error rate signal, while when said first error rate is equal to or greater than said predetermined error rate, said selector circuit is operative to output said second error rate.

* * * * *